Jan. 31, 1967 J. ZEMANEK, JR 3,302,166

MULTIPLE RECEIVER ACOUSTIC WELL LOGGING

Filed March 16, 1964 5 Sheets-Sheet 1

United States Patent Office 3,302,166
Patented Jan. 31, 1967

3,302,166
MULTIPLE RECEIVER ACOUSTIC
WELL LOGGING
Joseph Zemanek, Jr., Dallas, Tex., assignor to Mobil Oil
Corporation, a corporation of New York
Filed Mar. 16, 1964, Ser. No. 352,173
18 Claims. (Cl. 340—18)

This invention relates to acoustic velocity logging of earth formations traversed by a borehole and, more particularly, to a method of and apparatus for obtaining in correlation with depth of a borehole a log of the acoustic velocity of the earth formations surrounding the borehole with compensation for irregularities in borehole diameter.

In seismic exploration, well logging techniques are used to determine the character of subsurface formations penetrated by a borehole. One technique of logging these characteristics employs a logging tool including a transmitter of acoustic impulses and a receiver, or receivers, for detecting these acoustic impulses after they have traversed the subsurface formations adjacent the tool. By measuring the travel time of an acoustic impulse from the transmitter through the formation to the receiver, an indication of the velocity of acoustic impulses through the subsurface formation is obtained and this acoustic velocity is an indication of the character of the subsurface formation. By recording the acoustic velocity in correlation with depth of borehole as the tool moves through the borehole, there is obtained a log of the characteristics of the subsurface formations as a function of depth. Such logs are quite useful in seismic exploration and, particularly, in the exploration for oil-bearing subsurface strata.

One of the difficulties which has been encountered in employing this well logging technique is that the measurement of acoustic velocity may be dependent upon the diameter of the borehole and the characteristics of the medium filling the borehole as well as the characteristics of the subsurface formations surrounding the borehole. It is desirable to eliminate the influence of borehole diameter and borehole medium on acoustic velocity measurements so that these measurements are dependent solely upon the character of the subsurface formations surrounding the borehole.

In the prior art, a single transmitter logging tool with two receivers has been employed to eliminate the influence of the borehole medium on the acoustic velocity measurements. By obtaining measurements of the travel times of acoustic impulses from the transmitter to one receiver and then to a second receiver and by obtaining the difference of these two measurements, there is eliminated from the final result the effect of the travel time of the impulse through the borehole medium. However, these two-receiver logging tools are still subject to the influence of localized variations or irregularities in borehole diameter. If the borehole diameter adjacent one receiver is different from the diameter adjacent the second receiver, the acoustic impulses travel different path lengths through the borehole medium to the two receivers. Therefore, the effect of the travel of the acoustic impulse between the tool and the borehole wall is not completely eliminated when the difference between the two measurements is obtained.

One technique of eliminating errors introduced by local variations in borehole diameter employs a logging tool including two transmitters spaced on either side of two receivers. By use of such a tool it is possible to combine the measurements provided by the two transmitters and two receivers to cancel out the effect of localized borehole diameter variations. A logging tool of this type does eliminate the errors. However, such a tool has other disadvantages. First, a two-transmitter, two-receiver logging tool of the type which eliminates the errors necessarily has two transmitters positioned in fixed spaced relationship in the tool with the receivers positioned between the two transmitters. With this arrangement, it is not possible to change the receiver spacing with the desired flexibility. This becomes a particular problem when the tool is to be used in logging through formations having widely different characteristics. In such cases, it is necessary to change the receiver spacing to compensate for the widely different travel times of the acoustic impulses from the transmitter to the receiver caused by the different characteristics of the formations in which the tool is used.

Another disadvantage is that the use of two transmitters is more costly than the use of only a single transmitter. Moreover, the use of two transmitters introduces an even more serious problem. In two-transmitter systems, the transmitters are pulsed alternately. Since the transmitters are pulsed with a high voltage, this requires the switching of a high voltage between the two transmitters. The switching of a high voltage is a difficult problem in itself and, in addition, this high voltage switching causes other problems such as inducing unwanted transients in the receiver circuits.

Still another disadvantage of prior art two-transmitter, multiple-receiver logging tools is that the tool cannot conveniently be used to obtain a log all the way to the bottom of the borehole.

Accordingly, it is an important object of the present invention to perform compensated borehole logging with a single transmitter and multiple receivers and, more particularly, to provide compensation for localized variations in borehole diameter in logs obtained with a single transmitter tool.

It is a further object of the present invention to provide a borehole logging system in which multiple receivers spaced on either side of a single transmitter successively detect seismic impulses transmitted from said transmitter and in which the successively detected receiver signals are combined to provide a log of acoustic velocity of the earth as a function of depth without variations caused by localized variations in borehole diameter or in the medium filling the borehole.

Still another object of the present invention is to provide a single transmitter, multiple-receiver logging tool which can easily be adapted to run conventional spacing logs and which can be used as a two-receiver logging tool to obtain logs all the way to the bottom of a borehole.

In accordance with one embodiment of the invention, a logging tool is provided with a transmitter of acoustic impulses. First and second receivers are spaced along the logging tool on one side of the transmitter and third and fourth receivers are spaced along the logging tool on the other side of the transmitter. The logging system is provided with gating circuits which permit the first transmitted acoustic impulse to be detected and transmitted uphole by the first receiver, the second acoustic impulse by the second receiver, the third acoustic impulse by the third receiver, and the fourth acoustic impulse by the fourth receiver. The cycle is then repeated with successive transmitter pulses being detected and transmitted uphole by successive ones of the receivers. The time interval between each transmitter pulse and the detection of that pulse at a particular receiver is recorded. These four time intervals are combined to provide an indication of acoustic velocity adjacent the logging tool. This indication of acoustic velocity is not influenced by the effects of the borehole medium or local irregularities in borehole diameter.

In order to combine the four time intervals in a manner which will cancel out the undesired effects, it is necessary to delay the recorded time intervals associated with the third and fourth receivers. It is necessary to delay the recorded time increments associated with the third and fourth receivers by a time delay determined by the distance between the midpoint between the receivers on one side of the transmitter and the midpoint between the receivers on the other side of the transmitter and by the rate of travel of the logging tool through the borehole so that the time intervals of acoustic impulse travel paths through the same subsurface segment are combined. In this manner, it is possible to obtain a log of acoustic velocity as a function of depth of borehole without variations caused by borehole medium or diameter of borehole.

The foregoing and further objects, features and advantages of the invention will be better understood with reference to the following more detailed description and appended claims in conjunction with the drawings in which:

Figures 1, 1A, 1B, 1C:
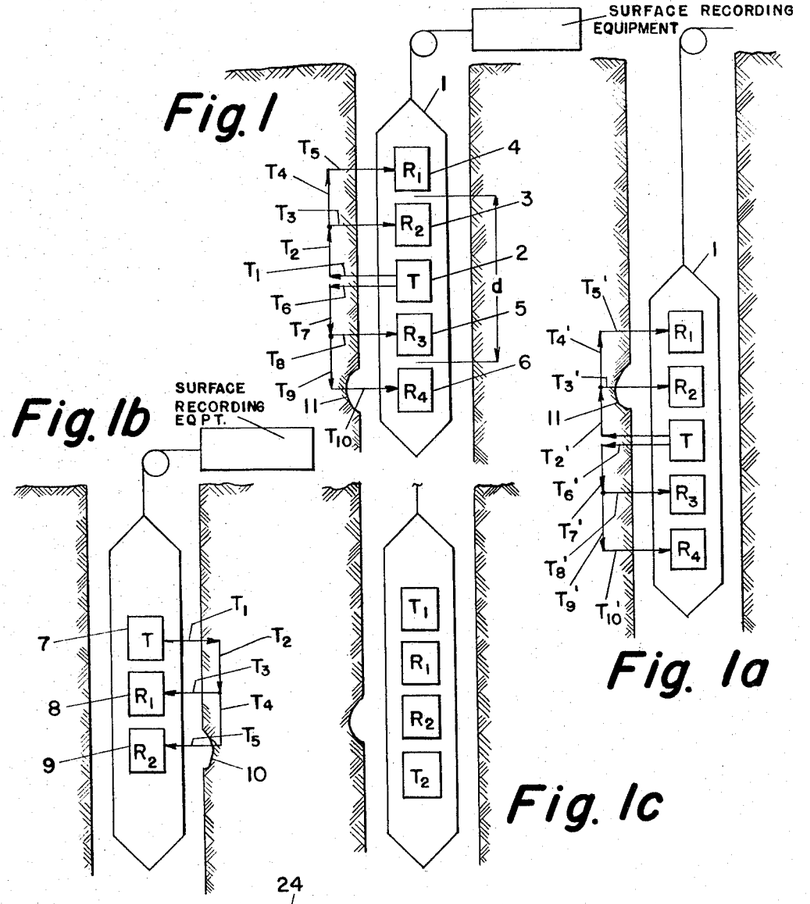
FIG. 1 shows a single transmitter, multiple-receiver logging tool provided in accordance with this invention.
FIG. 1a shows the same logging tool in another position in the borehole.
FIG. 1b shows a prior art two-receiver logging system.
FIG. 1c shows a two-transmitter, two-receiver prior art logging tool.

Referring now to FIG. 1, there is shown a logging tool 1 including a single transmitter 2 and receivers 3–6. This logging tool provides very much improved results over those provided by prior art logging tools. Examples of such prior art logging tools are shown in FIGS. 1b and 1c. In FIG. 1b, there is shown a two-receiver logging tool. In acoustic velocity logging it is conventional to measure the time interval required for an acoustic impulse transmitted by transmitter 7 to travel through the formation surrounding the borehole to one of the receivers spaced from the transmitter. The time required for an acoustic impulse to travel from transmitter 7 to receiver 8 can be broken down into the time $T_1$ for the impulse to travel from the transmitter into the formation, the time $T_2$ required for the impulse to travel through the formation, and the time $T_3$ required for the impulse to travel from the formation into the receiver 8. Thus, the time interval required for an impulse to travel from transmitter 7 to receiver 8, denoted $t_1$, is given by:

(1)  $$t_1 = T_1 + T_2 + T_3$$

It can be seen that the measurement of the time interval $t_1$ does provide an indication of the acoustic velocity of an impulse through the formation adjacent the borehole. However, this measurement is also influenced greatly by the travel time of the impulse between the logging tool and the side of the borehole. Because of this, the times $T_1$ and $T_3$ in the above expression will vary depending on the medium which fills the borehole. This introduces errors into the desired measurement of the acoustic velocity through the formation adjacent the borehole.

In order to solve this problem, there was provided a two-receiver log such as that shown in FIG. 1b. By obtaining the difference in the time intervals required for acoustic impulses to travel to the two receivers, there is obtained a measurement of acoustic velocity through the earth formation without the influence of the borehole medium on the measurement. This can be demonstrated quite readily by noting first that the time required for an impulse to travel from the transmitter to receiver 9, denoted $t_2$, is given by:

(2)  $$t_2 = T_1 + T_2 + T_4 + T_5$$

The difference between the travel times required for impulses to travel to receivers 8 and 9 is given by the following expression in which the difference is denoted $\Delta t_{12}$:

(3)  $$\Delta t_{12} = t_2 - t_1 = (T_1 + T_2 + T_4 + T_5) - (T_1 + T_2 + T_3) = T_4 + T_5 - T_3$$

Usually, the times required for the acoustic impulses to travel between the borehole wall and the receivers are equal. These times are denoted $T_3$ and $T_5$ in Equation 3. Therefore, $T_5$ and $T_3$ usually cancel in Equation 3 and there is provided a measurement $\Delta t_{12}$ which is indicative only of the acoustic velocity through the formation and is not affected by the medium filling the borehole. The assumption that $T_3$ equals $T_5$ is a good one where the diameter of the borehole is the same adjacent both receivers. However, where there is a localized variation in the borehole diameter, such as the variation 10 shown in FIG. 1b, then a two-receiver logging tool does not provide good results. In this case, $T_3$ does not equal $T_5$ and these two will not cancel in Equation 3. The result is that the measurement of acoustic velocity, $\Delta t_{12}$, is somewhat dependent upon the borehole medium and on the variations in borehole diameter.

One technique for compensating for errors introduced by localized variations in borehole diameter employs a two-transmitter, two-receiver logging tool such as that shown in FIG. 1c. Such a logging tool and the manner in which this logging tool compensates for the errors is described in U.S. Patent 2,798,485 to Charles B. Vogel. While logging tools of the type shown in FIG. 1c do compensate for variations in borehole diameter, they have other disadvantages. As previously discussed, these logging tools have the disadvantages of requiring two transmitters, requiring high voltage switching between the transmitters, lack of flexibility in changing receiver spacing, not being easily adaptable to run conventional spacing logs and not being adaptable for use as a two-receiver log to obtain logs all the way to the bottom of the borehole.

These problems are eliminated by utilizing the single transmitter, four-receiver logging tool of FIG. 1. This logging tool does not have the above-mentioned disadvantages of a two-transmitter, two-receiver tool but at the same time the logging tool shown in FIG. 1 does compensate for the errors introduced by localized variations in borehole diameter.

The manner in which the single transmitter, four-receiver logging tool of FIG. 1 solves the problem can best be demonstrated by an analysis of the travel times between the transmitter and the various receivers. The travel time for an impulse between transmitter 2 and receiver 3 is given by:

(4)  $$t_1 = T_1 + T_2 + T_3$$

Similarly, the travel time between transmitter 2 and the receiver 4 is given by:

(5) $\qquad t_2 = T_1 + T_2 + T_4 + T_5$

In a manner similar to that employed in the two-receiver log, the difference between the travel times to receivers 3 and 4 is obtained. This difference, denoted $\Delta t_{12}$, is given below:

(6) $\qquad \Delta t_{12} = t_2 - t_1$
(7) $\qquad \Delta t_{12} = T_1 + T_2 + T_4 + T_5 - T_1 - T_2 - T_3$
(8) $\qquad \Delta t_{12} = T_4 + T_5 - T_3$ Similarly, the difference between the travel times to the receivers 5 and 6 is given as follows where $\Delta t_{34}$ denotes the difference:

(9) $\qquad \Delta t_{34} = t_4 - t_3$
(10) $\qquad \Delta t_{34} = T_6 + T_7 + T_9 + T_{10} - T_6 - T_7 - T_8$
(11) $\qquad \Delta t_{34} = T_9 + T_{10} - T_8$ It is possible to combine the differences $\Delta t_{12}$ and $\Delta t_{34}$ in a manner which eliminates any adverse effect on the acoustic velocity measurement due to localized variations in borehole diameter. In order to do this, it is necessary to delay the difference measurement $\Delta t_{34}$. The difference measurement $\Delta t_{34}$ is recorded and delayed until a time when the logging tool is in the position shown in FIG. 1a. In FIG. 1a, the same travel times between transmitters and receivers are denoted with like subscripts to the travel times shown in FIG. 1, the only difference being that the travel times are primed in FIG. 1a. The logging tool shown in FIG. 1a has been lowered to a position such that the acoustic impulses travel through the same segment of the subsurface formation in reaching the receivers $R_1$ and $R_2$ as was traversed by the acoustic impulses in travelling from the transmitter to the receivers $R_3$ and $R_4$ when the tool was in the position shown in FIG. 1. Because of this, the travel time from the formation to the receiver $R_2$ in FIG. 1a, this travel time being denoted $T'_3$, is the same as the travel time from the formation to the receiver $R_4$ in FIG. 1, this travel time being denoted $T_{10}$. Similarly, the travel time $T'_5$ is the same as the travel time $T_8$.

In order to combine the travel times of acoustic impulses to the various receivers in a manner which will eliminate the effect of localized variations in borehole diameter, it is necessary to average the time interval measurement $\Delta t'_{12}$ with the delayed time interval measurement $\Delta t_{34}$. That is, the compensated acoustic velocity measurement $\Delta t$ is given by:

(12) $\qquad \Delta t = (\Delta t'_{12} + \Delta t_{34})/2$

The difference $\Delta t'_{12}$ is determined in a manner similar to that explained in conjunction with Equation 8 and is given by:

$\qquad \Delta t'_{12} = T'_4 + T'_5 - T'_3 \qquad$ (8a)

Substituting Equations 8a and 11 into Equation 12 there is obtained:

(13) $\qquad \Delta t = T'_4 + T'_5 - T'_3 + T_9 + T_{10} - T_8$

However, it will be remembered that because $\Delta t_{34}$ has been delayed, $T'_3 = T_{10}$; $T'_5 = T_8$; and $T'_4 = T_9$. Therefore, all effects of travel time between transmitter and borehole wall in Equation 13 are canceled out leaving:

(14) $\qquad \Delta t = (T'_4 + T_9)/2 = T'_4 = T_9$

In this manner, there has been obtained a measure of acoustic velocity $\Delta t$ which is dependent only upon the travel time of the acoustic impulse through the formation and is not dependent on the travel time between the tool and the side of the borehole. Therefore, the presence of minor variations in borehole diameter such as the local variation at 11 in FIG. 1, will not affect the velocity measurement.

It should be noted that the delay introduced into the $\Delta t_{34}$ signal must be such that the delayed $\Delta t_{34}$ signal is obtained by passage of acoustic impulses through the same subsurface segment as those through which the acoustic impulses passed in determining the $\Delta t'_{12}$ signal. This delay is determined by the spacing between the receivers on one side of the transmitter and the receivers on the other side of the transmitter. Specifically, if the distance $d$ in FIG. 1 is the spacing between the two receivers $R_1$ and $R_2$ and the two receivers $R_3$ and $R_4$, and if the logging tool 1 is assumed to be moving through the borehole at a rate $r$, then the time delay is given by $d/r$.

Figure 2:
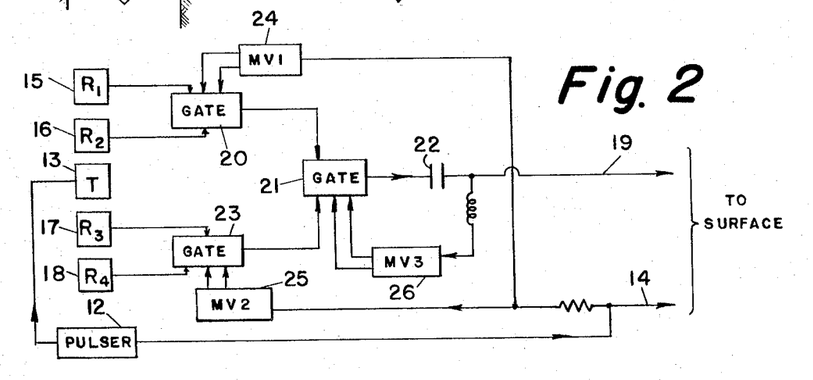
FIG. 2 shows the downhole gating circuitry provided in accordance with one embodiment of the invention.

In order to successively transmit the signals from the four receivers $R_1$–$R_4$ to the surface so that the time intervals between the transmitter pulses and each of the receiver pulses can be measured, the downhole gating circuitry shown in FIG. 2 is provided. In FIG. 2, a pulser circuit 12 periodically energizes the transmitter 13 to transmit acoustic impulses into the surrounding formation. The pulses from the pulser 12 are also transmitted uphole over the line 14. The acoustic impulses transmitted by transmitter 13 are detected by the receivers 15, 16, 17 and 18. First, the receiver pulse detected by receiver 15 is transmitted uphole over line 19. At the uphole location the time interval between the transmitter pulse, as evidenced by the pulse on line 14, and the first receiver pulse is measured. When the next transmitter pulse is detected by the receivers, the receiver pulse detected by receiver 16 is transmitted uphole over line 19 and the interval between the second transmitter pulse and the detection of the acoustical impulse at receiver 16 is measured. Similarly, the third acoustical impulse is detected by receiver 17 and this receiver pulse is transmitted over line 19 uphole where the time interval is measured. The detection of the fourth transmitter pulse by the receiver 18 is transmitted uphole over line 19 and the time interval between that receiver pulse and the transmitter pulse which produced it is measured.

In order to successively gate the receiver pulses produced by successive transmitter pulses uphole, the gating circuitry shown in FIG. 2 is provided. The outputs of receivers 15 and 16 are connected through a gate 20, a gate 21 and a capacitor 22 to the line 19 which conveys the receiver pulses uphole. The receiver pulses from receivers 17 and 18 pass through a gate 23, gate 21 and capacitor 22 and the line 19 to the uphole location.

In order to determine which receiver pulse will be conveyed to the uphole location over line 19, the multivibrators 24, 25 and 26 are provided. These multivibrators are bistable devices which are commonly referred to as having or being in a 1 condition or in a 2 condition. That is, the multivibrators have two stable states which are arbitrarily designated the 1 state and the 2 state. The states of multivibrators 24, 25 and 26 are determined by control voltages conducted from the uphole location over lines 14 and 19 to the multivibrators. When the multivibrators 24, 25 and 26 are in the 1 condition, the multivibrators apply a voltage to the gates such that the top input to the gate will pass through the gate. For example, when multivibrator 24 is in the 1 condition, the output of receiver 15 passes through the gate 20. When multivibrator 24 is in the 2 condition, the output of receiver 16 passes through gate 20. Similarly, when multivibrator 26 is in the 1 condition, the output of gate 20 passes through gate 21 and when multivibrator 26 is in the 2 condition, the output of gate 23 passes through gate 21.

In order to control the condition of the multivibrators 24, 25 and 26, two different control voltages are conducted from the uphole location to the multivibrators over the conductors 14 and 19. Each of these control voltages has two levels which may arbitrarily be denoted the 0 level and the + level. Whenever the control voltage applied to the input of a multivibrator is at the 0 level, the multivibrator is switched to the 1 condition, and when the control voltage is at the + level, the multivibrator is switched to the 2 condition. That is, when control line 14 has a 0 control voltage level on it, multivibrators 24 and 25 are in the 1 condition, but when the line 14 has a + control voltage level on it, the multivibrators 24 and 25 are in the 2 state. Similarly, when the line 19 has a 0 control voltage level thereon, the multivibrator 26 is in the 1 condition, and when the line 19 has a + control voltage thereon, the multivibrator 26 is in the 2 condition. A summary of the control voltage levels on the lines 14 and 19 and the conditions which are thereby induced in multivibrators 24, 25 and 26 is contained in Table I below.

TABLE I

| Control Voltage Line 19 | Control Voltage Line 14 | MV 1 (24) | MV 2 (25) | MV 3 (26) | Receiver Connected |
|---|---|---|---|---|---|
| 0 | 0 | 1 | 1 | 1 | $R_1$ |
| 0 | + | 2 | 2 | 1 | $R_2$ |
| + | 0 | 1 | 1 | 2 | $R_3$ |
| + | + | 2 | 2 | 2 | $R_4$ |

From the above there can be seen the conditions which are necessary to connect each one of the receivers $R_1$, $R_2$, $R_3$ and $R_4$ to the uphole circuitry. Starting at the top of Table I above, when the line 19 has a 0 control voltage level and the line 14 has a 0 control voltage level, multivibrators 24, 25 and 26 are all in the 1 condition. Since multivibrator 24 is in the 1 condition, the top input to gate 20, that is receiver $R_1$, is connected through gate 20 to the input to gate 21. Since multivibrator 26 is in the 1 condition, the top input is connected through gate 21 and through the capacitor 22 to the line 19. Therefore, receiver $R_1$ is connected over the line 19 to the uphole equipment.

When the control voltage on line 14 is switched from the 0 to the + level, as is indicated on the second horizontal line of Table I above, then multivibrators 24 and 25 are switched to the 2 condition. In this condition, receiver $R_2$ is connected through gates 20 and 21 to line 19.

When the control voltage on line 19 is switched to a + level and the control voltage on line 14 is switched to a 0 level, then receiver $R_3$ is connected to the uphole equipment. Finally, as indicated on the fourth horizontal line of Table I above, when both control lines 14 and 19 are in the + level, then receiver $R_4$ is connected to the uphole equipment.

Figure 3:
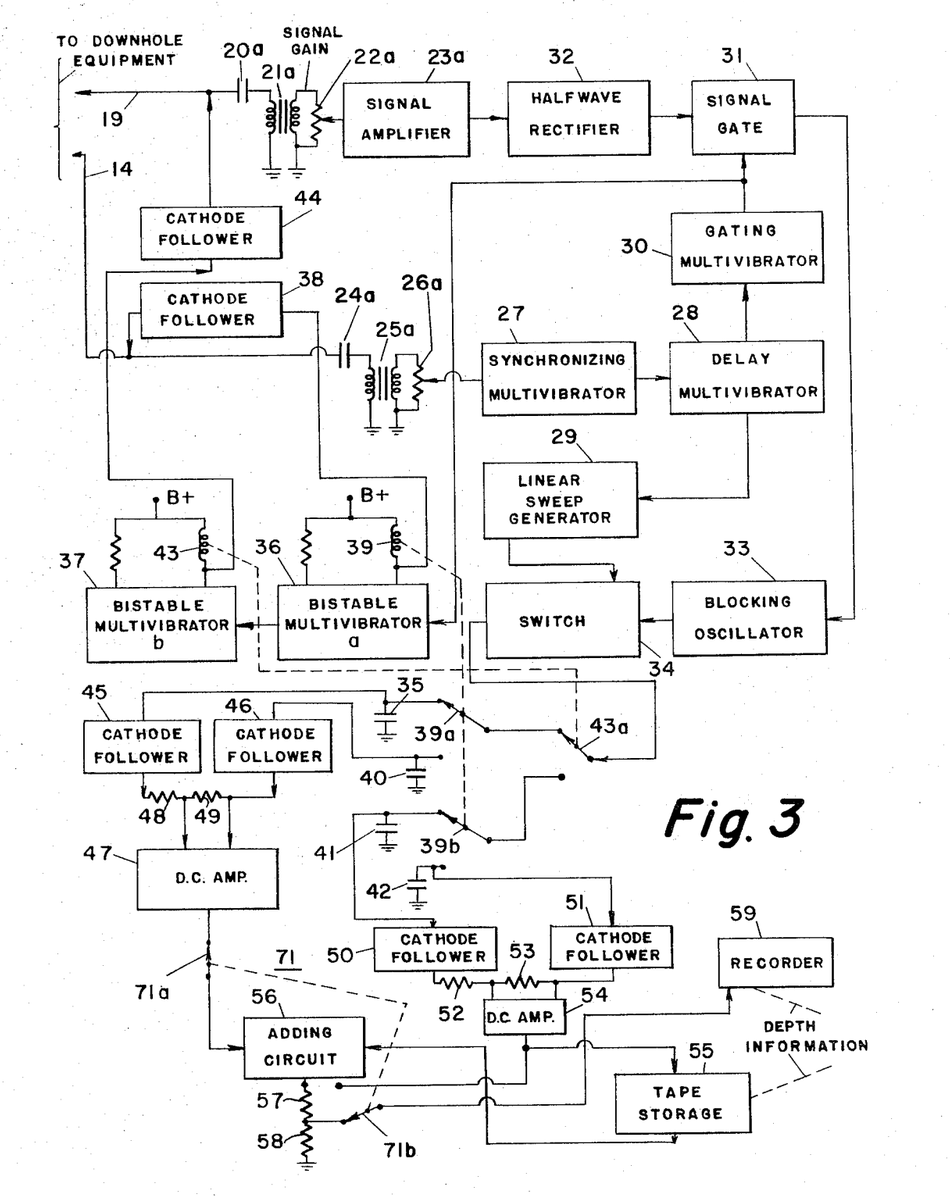
FIG. 3 shows the uphole circuitry provided in accordance with one embodiment of the invention.

In order to generate the + and 0 control voltages on lines 14 and 19 and to record the signals detected by receivers $R_1$–$R_4$, the circuitry shown in FIG. 3 is provided. The receiver signals from the downhole equipment are conducted over line 19 and through capacitor 20a, transformer 21a, and gain-changing resistor 22a to a signal amplifier 23a. The transmitter pulses are conducted from the downhole location over line 14 and through capacitor 24a transformer 25a and gain-changing resistor 26a to the synchronizing multivibrator 27.

In order to measure acoustic velocity, it is necessary to measure the time interval between each transmitter pulse on line 14 and the next receiver pulse on line 19. In order to do this, the transmitter pulse triggers the synchronizing multivibrator 27. In order to delay the opening of the receiver signal gates so that the transmitter pulse will not interfere with the receiver pulse, a delay multivibrator 28 of the monostable type is provided. The output of synchronizing multivibrator 27 triggers delay multivibrator 28 to its unstable state and it remains in its unstable state for only a short time, and then returns to its stable state prior to the reception of the receiver pulse. The two outputs of delay multivibrator 28 are connected to a linear sweep generator 29 and to a gating multivibrator 30. The linear sweep generator 29 starts its linear sweep when the delay multivibrator 28 is triggered to its unstable state. The gating multivibrator 30 is switched to a condition which opens signal gate 31 when the delay multivibrator 28 returns to its stable state. In this manner, the linear sweep generator 29 starts a linearly rising ramp voltage sweep in coincidence with the occurrence of the transmitter pulse. The receiver pulse passes through half-wave rectifier 32 and signal gate 31 to trigger a blocking oscillator 33. Blocking oscillator 33 closes the switching circuit 34 to sample the linearly rising ramp voltage output of sweep generator 29 and to store this sample voltage on the capacitor 35. Since the linear ramp voltage was initiated by the transmitter pulse and since the linearly rising ramp voltage was sampled at the time of the receiver pulse, the voltage stored on capacitor 35 will have a magnitude which is proportional to the time interval between the transmitter pulse and the receiver pulse. The manner in which this time measurement is made by initiating a ramp voltage with the transmitter pulse and sampling the ramp voltage upon the occurrence of the receiver pulse is more fully described in the U.S. Patent to Gerald C. Summers, Re. 24,446. In that patent, the circuitry shown for the blocking oscillator 31 is suitable for use as the blocking oscillator 33 in this application; the circuitry shown as the voltage generator 34 is suitable for use as the linear sweep generator 29; and the switch and condenser 32 are suitable for use as the switch 34 and capacitor 35 in this application.

It will be remembered that the condition of the gates in the downhole equipment was such that the receiver pulse from the first receiver $R_1$ was first transmitted over line 19. Therefore, the voltage recorded on capacitor 35 will be proportional to the time interval between a transmitter pulse and the detection of the resulting acoustic impulse at the first receiver. In order to switch the condition of the downhole gates so that the next receiver pulse to be transmitted uphole will be that from the second receiver, the multivibrators 36 and 37 are provided.

As will be subsequently described, bistable multivibrators 36 and 37 have two stable states. These multivibrators conventionally are of the type having two active elements, either transistors or vacuum tubes. One of these elements is conducting when the multivibrator is in one stable state and the other element is conducting when the multivibrator is in the other stable state. For the purposes of this description, we will assume that the multivibrator is in the 2 condition when the right-hand element is off. That is, when the right-hand element of multivibrator 36 is cut off, the right-hand output at the top of multivibrator 36 has a + voltage condition thereon. This + voltage condition is applied through cathode follower 38 to the line 14. Conversely, when multivibrator 36 is in the 1 condition, a 0 level control voltage is applied through cathode follower 38 to the line 14.

Prior to the detection of an impulse by the first receiver and the gating of this first receiver pulse to the uphole location, the line 14 is at the 0 level as previously discussed in conjunction with the Table I above. This 0 level on line 14 was induced by the multivibrator 36 being in the 1 condition. That is, the right-hand element of multivibrator 36 is conducting. Also connected to this right-hand element is a relay winding 39, the contacts of which control the recording of different time intervals on different capacitors. When relay 39 is energized, the contact 39a connects the time interval voltage of switch 34 to the capacitor 35. When multivibrator 36 is in the 2 condition, the right-hand element of multivibrator 36 is turned off and contact 39a is in its lowermost position, thereby connecting the time interval measurement to the capacitor 40. A second contact 39b performs a similar switching operation between the storage capacitors 41 and 42.

A further switching of the time intervals to be recorded on capacitors 35, 40, 41 and 42 is performed by the relay 43 and its associated contact 43a. The relay 43 is controlled by the right-hand element in multivibrator 37.

When multivibrator 37 is in the 1 condition, the right-hand element is conducting and the relay 43 is energized thereby maintaining contact 43a in its uppermost position.

The inputs to both multivibrators 36 and 37 are connected so that the multivibrators 36 and 37 will change conditions in response to the switching of gating multivibrator 30. The right-hand output of multivibrator 37 is applied through cathode follower 44 to the line 19. The result is that successive transmitter pulses switch the conditions of multivibrators 36 and 37 so that they apply the control voltages to lines 14 and 19, as are indicated by the first two columns of Table I above.

After voltages representative of the time intervals between transmitter pulses and the reception of successive transmitter pulses at receivers $R_1-R_4$ have been stored on capacitors 35, 40, 41 and 42, it is necessary to combine these voltages to produce the final function representative of acoustic velocity. In order to do this, the voltages on capacitors 35 and 40 are applied through cathode followers 45 and 46, respectively, to a D.C. amplifier 47. The voltages on capacitors 35 and 40 are respectively representative of the time required for an impulse to travel from the transmitter to first receiver 15 and the time required for an impulse to travel from the transmitter to second receiver 16. As mentioned above in conjunction with Equation 6, it is desirable to obtain the difference between these two voltages. In order to do this, the output of cathode followers 45 and 46 are applied through resistors 48 and 49 to the D.C. amplifier 47 in such a manner that the difference between the two voltages is obtained. That is, the output of D.C. amplifier 47 is proportional to $\Delta t_{12}$ which is the difference in the travel times of an acoustic impulse to receiver 15 and to receiver 16.

Similarly, the voltages on capacitors 41 and 42 are respectively applied through cathode followers 50 and 51 and resistors 52 and 53 to a D.C. amplifier 54. The output of D.C. amplifier 54 represents the difference between the travel times of impulses to third and fourth receivers 17 and 18. This is obtained in accordance with Equation 9 above.

In order to delay one of the difference measurements so that the time intervals can be combined to eliminate the effects of variations in borehole diameter, a tape storage device 55 is provided. It will be appreciated that any suitable delay means can be used for this purpose. As shown in FIG. 3, the time interval measurements from third and fourth receivers 17 and 18 are delayed by tape storage device 55. This is necessary since it was assumed in describing FIGS. 1 and 1a that the logging was being performed while the tool was progressing downwardly in the borehole. However, it will be appreciated that logging can and, in fact, quite often is performed while the tool is moving upwardly in the borehole. In such a case, it would only be necessary to connect the time interval measurements associated with receivers 15 and 16 to the tape storage device 55 thereby delaying them instead of the time interval measurements associated with receivers 17 and 18 as is shown.

The tape storage device 55 moves in correlation with the travel of the logging tool through the borehole as is indicated by the dashed line marked "depth information." Therefore, the amount of delay between the input to the tape storage device and the output of the tape storage device is determined by the travel rate of the logging tool through the borehole. A mechanical connection between the tape storage drive and the drive for moving the logging tool through the borehole provides a simple means for insuring that the delay between input head and output head will be inversely proportional to the rate of travel of the logging tool. Because of this mechanical connection, as the rate of travel of the tool through the borehole increases, the speed of the tape storage device increases and the delay between input head and pickup head decreases. The converse, of course, is also true.

Since the spacing between the receivers and the transmitters is known and the spacing between the input and the pickup head on tape storage device 55 can be adjusted, the amount of delay between input and output can be adjusted so that the delayed difference measurement from tape storage device 55 is obtained from the same section of the subsurface formation as is the undelayed difference measurement from D.C. amplifier 47. This requirement that the delay be accurately determined in accordance with the spacing of the borehole and the travel time of the tool through the borehole was previously discussed in conjunction with FIGS. 1 and 1a. It will be appreciated that various other techniques may be devised to insure that the delay is accurately related to receiver spacing and logging tool travel rate.

In order to combine the difference measurement associated with receivers 15 and 16, $\Delta t_{34}$, and adding circuit 56 is provided. The outputs of D.C. amplifier 47 and the tape storage device 55 are both connected to the input to adding circuit 56. The output of adding circuit 56 is connected to a potential divider including resistors 57 and 58 which divides the output voltage by 2. This is as described in conjunction with Equation 12 above. The result is a measurement $\Delta t$ of acoustic velocity which measurement is not affected by localized variations in borehole diameter. The voltage proportional to $\Delta t$ is applied to a recorder 59 which records the function in correlation with the depth of the logging tool in the borehole.

Figures 4A, 4B:
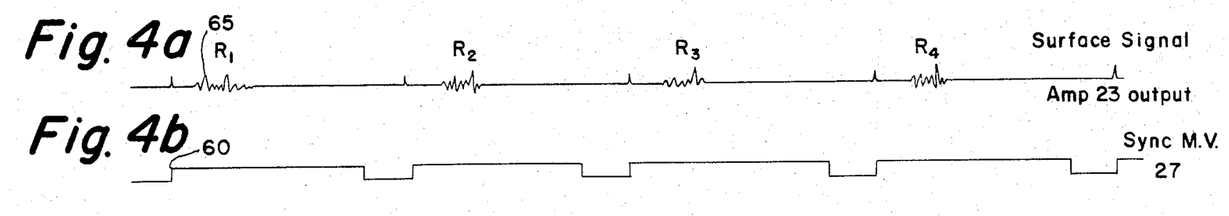
FIGS. 4a–4g show waveforms depicting the operation of the invention.

The operation of the system can best be explained with reference to the waveforms of FIGS. 4a–4g. Initially, assume that multivibrators 36 and 37 are in the 1 condition. Therefore, a 0 control voltage is impressed on both lines 14 and 19 as indicated in FIGS. 4e and 4f. The 0 control voltage on line 14 puts downhole multivibrators 24 and 25 in the 1 condition and the 0 control voltage on line 19 puts the downhole multivibrator 26 in the 1 state. Since multivibrator 24 is in the 1 state, the gate 20 is open for the receiver $R_1$. This receiver pulse will also pass through a gate 21 since the multivibrator 26 is in the 1 condition which allows the top input to pass through gate 21. Therefore, the downhole switching circuitry is in a condition to pass a pulse detected by receiver $R_1$.

Upon the occurrence of the first transmitter pulse, a pulse 61 (FIG. 4e) is conducted over line 14 uphole to the synchronizing multivibrator 27 which is triggered to its unstable condition. The output of synchronizing multivibrator 27 goes positive as indicated at 60 in FIG. 4b. Synchronizing multivibrator 27 serves the purpose of preventing spurious noise signals from affecting the system. The synchronizing multivibrator 27 remains in its unstable state during most of the cycle between transmitter pulses. Therefore, during this time it will not be affected by extraneous noise pulses, thereby reducing the possibility of these extraneous noise pulses affecting the operation of the system.

Figure 4C:
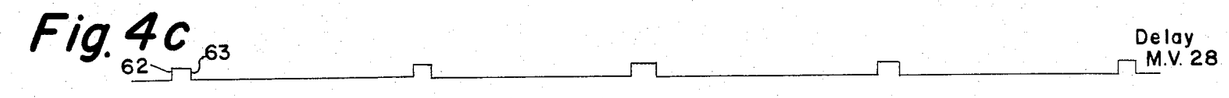

When synchronizing multivibrator 27 is switched to its unstable condition, its output also switches delay multivibrator 28 to the unstable condition as indicated at 62 in FIG. 4c. The purpose of delay multivibrator 28 is to delay opening signal gate 31 until after the occurrence of the transmitter pulse. When delay multivibrator 28 returns to its stable condition, indicated at 63 in FIG. 4c, the gating multivibrator 30 is switched to its unstable condition as indicated at 64 in FIG. 4d. The output of gating multivibrator 30 is applied to the signal gate 31 so that the signal gate 31 will be opened when the gating multivibrator 30 is in its unstable condition. Gating multivibrator 30 remains in the unstable condition during the expected time of arrival of a receiver pulse.

When delay multivibrator 28 switches from its stable to its unstable condition, as indicated at 62 in FIG. 4c, a linear sweep generator 29 initiates a linear ramp voltage output which is applied to switch 34.

When the first transmitter pulse is detected at receiver $R_1$, this pulse passes through gates 20 and 21, as previously described, and is transmitted uphole to appear as the receiver pulse 65 in FIG. 4a. This receiver pulse 65 passes through half-wave rectifier 32 and signal gate 31 and triggers blocking oscillator 33. Blocking oscillator 33 causes the switch 34 to sample the linear ramp voltage thereby applying a voltage to capacitor 35 which is proportional to the time interval between the first transmitter pulse and the detection of this acoustic impulse at the first receiver 15.

Figure 4D:
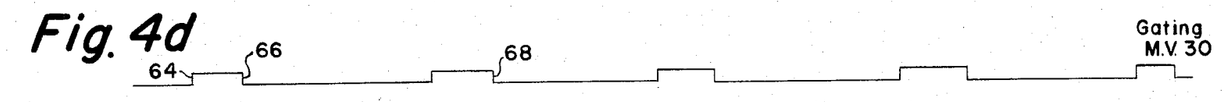
Figure 4E:
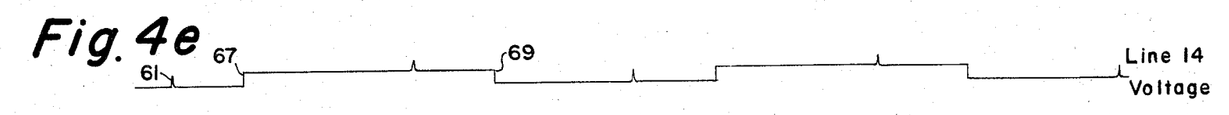
Figure 4F:
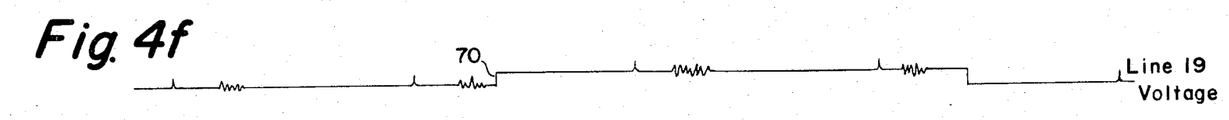

The next event in time is the return of the gating multivibrator 30 to its stable condition as indicated at 66 in FIG. 4d. When gating multivibrator 30 is switched from its unstable to its stable state, that is, the output goes from a positive voltage to a more negative voltage, the multivibrator 36 switches conditions. This is indicated by the output of bistable multivibrator 36 switching from a 0 to a + control voltage output as indicated at 67 in FIG. 4e. This applies a + control voltage condition to the line 14 which puts downhole multivibrators 24 and 25 in the 2 condition. In this condition, the gates 20 and 21 will pass the receiver pulse from the second receiver 16 to the line 19 and thence uphole. When bistable multivibrator 36 is switched from the 0 to the + state, the right-hand element of the multivibrator is cut off, thereby deenergizing relay 39 connected in circuit with that element. Because relay 39 is deenergized, the contact 39a returns to the lowermost position thereby setting the switch so that the next time interval measurement is recorded on capacitor 40.

Upon the occurrence of the next transmitter pulse, the acoustic impulse detected by the second receiver $R_2$ is conveyed uphole. This second receiver pulse produces a voltage at the output of switch 34 which is proportional to the time interval between the transmitter pulse and the detection of the acoustic impulse at the second receiver 16. This voltage is stored on capacitor 40.

Again, when the gating multivibrator 30 returns to its stable condition, as indicated at 68 in FIG. 4d, the bistable multivibrator 36 is switched, thus switching the line 14 from the + condition to the 0 condition, as indicated at 69 in FIG. 4e. Since bistable multivibrator 36 switches from a more positive to a more negative voltage, its output causes bistable multivibrator 37 to switch conditions. Bistable multivibrator 37 switches line 19 from the 0 to the + condition, as indicated at 70 in FIG. 4f. In this manner, a 0 control voltage is applied to line 14, and a + control voltage is applied to line 19. These two control voltages condition multivibrators 24, 25 and 26 so that the gates 20, 21 and 23 pass the receiver pulse from the third receiver 17 upon the detection of the next acoustic impulse. The bistable multivibrators 36 and 37 are in conditions such that relay 43 will be deenergized, relay contact 43a is in its lowermost position, and relay 39 will be energized, the contact 39b is in its uppermost position. Therefore, the time interval between the third transmitter pulse and the detection of the acoustic impulse at the third receiver 17 is stored on capacitor 41.

In a similar manner, the time interval between the fourth transmitter pulse and the detection of the acoustic impulse at the fourth receiver is recorded on capacitor 42.

The difference between the voltages on capacitors 35 and 40 is indicated by the output of D.C. amplifier 47. The output of D.C. amplifier 47 is proportional to $\Delta t_{12}$ as indicated by Equation 6 above.

Similarly, the difference between the voltages on capacitors 41 and 42 is indicated by the output of D.C. amplifier 54. The output of D.C. amplifier 54 is proportional to $\Delta t_{34}$ as indicated by Equation 9 above.

The output of D.C. amplifier 54 is stored on the tape storage device 55 which introduces a delay into the value of $\Delta t_{34}$. This delay is related to the receiver spacing and to the travel time of the logging tool through the borehole so that the output of tape storage 55 indicates a value of $\Delta t_{34}$ which is obtained from the same segment of the subsurface formation as the value of $\Delta t_{12}$ as indicated by the output of D.C. amplifier 47. The output of tape storage device 55 and D.C. amplifier 47 are added together in adding circuit 56, the output of which is divided by 2 by the potential divider. The result is a value of $\Delta t$ which is formed in accordance with Equation 12 above. This value of $\Delta t$ is indicative of the acoustic velocity of the earth formation adjacent the borehole and $\Delta t$ is not affected by the influence of borehole fluid or of localized variations or irregularities in borehole diameter. The value of $\Delta t$ is recorded as a function of depth on the recorder 59.

One important advantage of the subject system that has not thus far been described is its easy adaptability to use as a two-receiver logging tool. This is particularly advantageous when it is desired to log all the way to the bottom of the borehole. When it is desired to do this, a switch 71 is manually actuated so that the contacts 71a are open and the contact 71b is moved from its lower position to its upper position. The result of this is to cut out receivers $R_1$ and $R_2$ and the adding circuit 56, thereby making the log responsive only to receivers $R_3$ and $R_4$.

In the system shown in FIGS. 2 and 3, both lines 14 and 19 are required to conduct the control voltages downhole. In an alternate embodiment, shown in FIGS. 5 and 6, only one line between the downhole tool and the uphole equipment is required for conducting a varying level control voltage which conditions the downhole gates to successively pass receiver pulses from the four different receivers to the uphole location. This embodiment has the advantage that the other line, on which transmitter pulses are conducted uphole, can be used to conduct D.C. power downhole to supply the downhole equipment.

Figure 5:
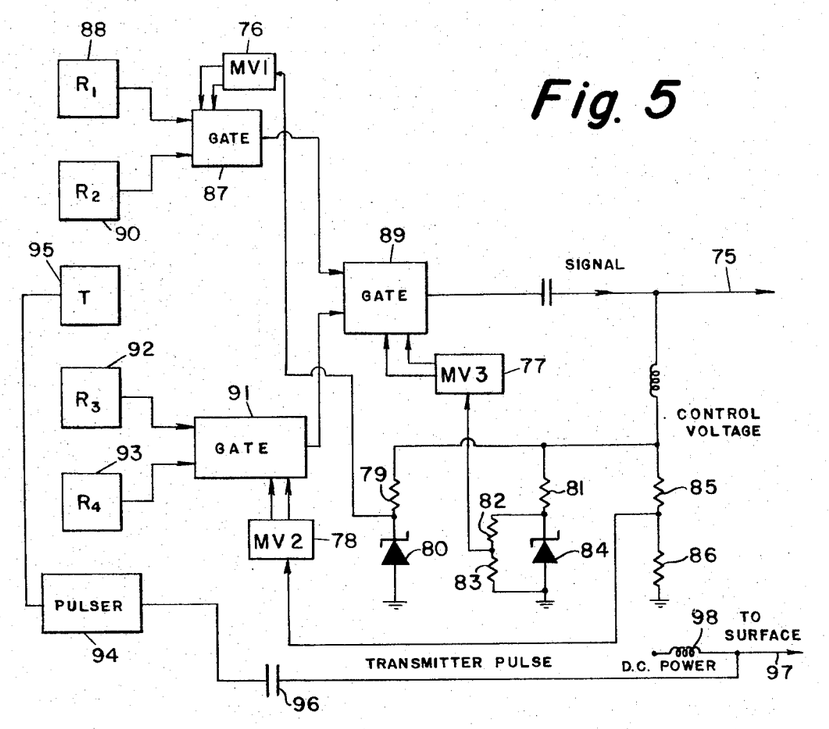
FIG. 5 shows the downhole gating circuitry for a second embodiment of the invention.

In order to control the downhole gates with a single conductor between the uphole and the downhole locations, it is necessary to generate a control voltage having four different levels. For purposes of explanation, assume that the control voltage has the four levels of 0 volt, 5–9 volts, 10–14 volts, and 15–19 volts. This four level control voltage is conducted from the uphole location over line 75 to the downhole location. The control voltage is applied to the three multivibrators 76, 77 and 78 through three voltage divider networks. The control voltage is applied through a voltage divider including resistor 79 and Zener diode 80 to the input to multivibrator 76. The control voltage is applied through a voltage divider including resistors 81, 82 and 83 and Zener diode 84 to the input to multivibrator 77. The control voltage is also applied to a voltage divider including resistors 85 and 86 to the input to multivibrator 78.

Each of the multivibrators 76, 77 and 78 is designed so that it will switch from the 1 state to the 2 state when the voltage at the input exceeds 5 volts. Each of the voltage dividers in the input circuits of these multivibrators is arranged so that different levels of control voltage must be applied to the voltage dividers in order to produce a 5 volt input to the multivibrators connected thereto.

The voltage divider including resistor 79 and Zener diode 80 provides a 5 volt input to multivibrator 76 when the control voltage is approximately 5 volts. Therefore, multivibrator 76 is switched from the 1 to the 2 state when the control voltage switches from 0 volt to the 5–9 volt level. Zener diode 80 is connected to ground so that when the control voltage exceeds approximately 5 or 6 volts, the Zener diode will break down, or conduct, thereby limiting the voltage applied to multivibrator 76 to approximately 5 or 6 volts.

The resistors 81, 82 and 83 form a voltage divider such that the control voltage must be in the range of 10 to 14 volts before the input to multivibrator 77 exceeds the triggering voltage of 5 volts. The Zener diode 84 conducts when the control voltage exceeds approximately 10 volts, so that the input voltage to multivibrator 77 in limited.

Finally, the voltage divider formed by resistors 85 and 86 is such that the control voltage must exceed 15 volts before a 5 volt triggering voltage is applied to multivibrator 78.

The four different levels of the control voltage and the conditions which these levels induce in multivibrators 76, 77 and 78 are shown in Table II below.

TABLE II

| Control Voltage | MV 1 (76) | MV 2 (78) | MV 3 (77) | Receiver Connected |
| --- | --- | --- | --- | --- |
| 0 | 1 | 1 | 1 | $R_1$ |
| 5–9 | 2 | 1 | 1 | $R_2$ |
| 10–14 | 2 | 1 | 2 | $R_3$ |
| 15-up | 2 | 2 | 2 | $R_4$ |

When the control voltage on line 75 approximates 0 volt, all three multivibrators are in the 1 condition. Therefore, gate 87 is conditioned to pass the receiver pulse from the first receiver 88 and gate 89 is conditioned to pass the first receiver pulse to the line 75 which conveys it uphole.

When the control voltage on line 75 switches to the 5–9 volt level, multivibrator 76 is switched to the 2 condition. This conditions gate 87 to pass the receiver pulse from the second receiver 90 and on uphole through gate 89. When the control voltage switches to the 10–14 volt level, multivibrator 77 is switched to the 2 condition. With multivibrator 77 in the 2 condition and multivibrator 78 in the 1 condition, the gate 91 and the gate 89 are conditioned to pass the receiver pulse from the third receiver 92.

Finally, when the control voltage switches to a level which is 15 volts or above, all three multivibrators 76, 77 and 78 are in the 2 condition. This conditions gates 91 and 89 to pass a receiver pulse from the fourth receiver 93 to the uphole location.

As was described in conjunction with the first embodiment of FIGS. 2 and 3, a free-running pulser circuit 94 actuates the transmitter 95 and simultaneously transmits transmitter pulses through capacitor 96 and over the conductor 97 to the uphole location. However, the important difference between the FIG. 5 embodiment and the FIG. 2 embodiment is that the conductor 97 in FIG. 5 does not have a changing level control voltage impressed thereon. Therefore, a D.C. voltage suitable for use in the downhole circuits can be conveyed to the logging tool over this line. A simple filter which may take the form of a choke coil 98 is provided to filter out the transmitter pulses from the D.C. voltage.

Figure 6:
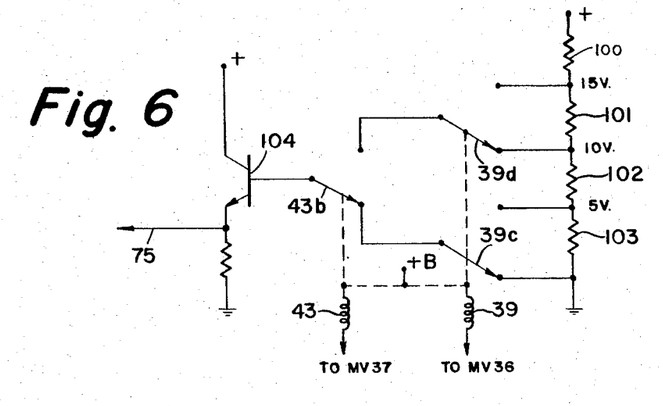
FIG. 6 shows uphole circuitry necessary for use with the second embodiment.

The surface equipment to be used with the downhole embodiment shown in FIG. 5 is substantially the same as the surface equipment shown in FIG. 3. The conductor 75, FIG. 5, is connected to the capacitor 20a in FIG. 3, and the conductor 97 is connected to the capacitor 24a in FIG. 3. The one modification which must be made in the FIG. 3 circuitry is that the cathode followers 38 and 44 are omitted so that the voltages produced by multivibrators 36 and 37 are not applied to the conductors which go downhole. Instead, the additional circuitry shown in FIG. 6 is provided to apply the four level control voltage to the conductor 75 which goes to the downhole equipment.

In order to provide the four levels of control voltage which are to be applied to the line 75, a voltage divider including resistors 100, 101, 102 and 103 is provided. This divider is arranged so that a 15 volt level is available at the lower end of resistor 100; a 10 volt level is available at the lower end of resistor 101; a 5 volt level is available at the lower end of resistor 102; and the lower end of resistor 103 is connected to ground.

In order to selectively apply these different levels of control voltage to the line 75, the relays 39 and 43 are provided with extra contacts. Relay 39, the winding of which has been duplicated in FIG. 6, has the additional contacts 39c and 39d. Relay 43, the winding of which has been duplicated in FIG. 6, has the extra contact 43b. Both relays 39 and 43 are selectively energized by the multivibrators 36 and 37 as described in conjunction with FIG. 3.

The relays are energized so that ground potential is applied through contact 39c and contact 43b and through emitter follower 104 to the line 75 during the time between the first transmitter pulse and the detection of the acoustic impulse at the first receiver. During the time between the second transmitter pulse and the detection of the acoustic impulse at the second receiver, the contact 39c is in its upper position thereby applying a 5 volt potential to the line 75. During the time between the third transmitter pulse and the detection of the acoustic impulse at the third receiver, the contact 39d is in its lower position and the contact 43b is in its upper position thereby applying +10 volts to the conductor 75. During the time interval between the fourth transmitter pulse and the detection of the acoustic impulse at the fourth receiver, the contact 39d is in its upper position and the contact 43b is in its upper position thereby applying +15 volts to the conductor 75.

Figure 4G:
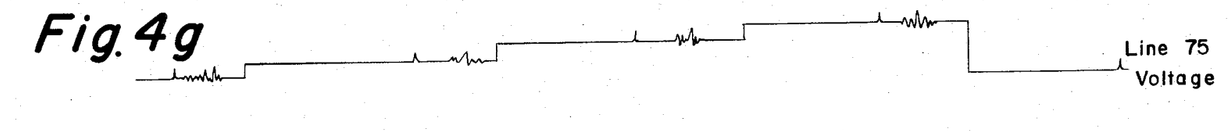

This is best shown with reference to the waveform of FIG. 4g which shows the four level control voltage which is applied to the line 75. The waveforms of FIGS. 4a, 4b, 4c and 4d, showing respectively the outputs of the signal amplifier 23a, the synchronizing multivibrator 27, the delay multivibrator 28 and the gating multivibrator 30, will be the same for the embodiment shown and described in conjunction with FIGS. 5 and 6 as for the embodiment of FIGS. 2 and 3. The only difference in the waveforms will be that one of the conductors which connects the uphole location with the downhole tool will have the four level control voltage shown in FIG. 4g impressed thereon while the other conductor has only a D.C. power voltage and the transmitter pulses impressed thereon.

Figure 7:
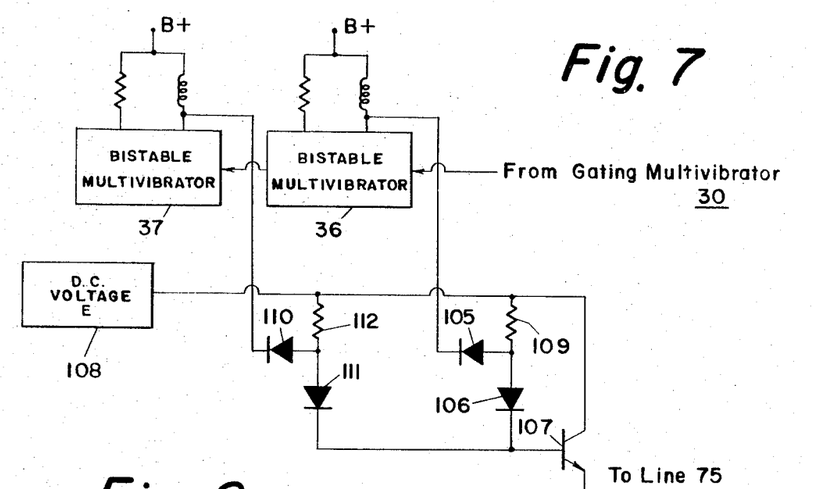
FIG. 7 shows an alternate embodiment of the uphole circuitry shown in FIG. 6.

An alternative to the relay switching system shown in FIG. 6 for generating the four level control voltage is shown in FIG. 7. This circuit includes diodes connected to the outputs of multivibrators 36 and 37, shown in FIG. 3 and duplicated in FIG. 7, to produce a four level control voltage on the line 75 which is connected to the downhole gating circuits of FIG. 5. In order to produce the 5 volt level, diodes 105 and 106 are connected between the output of bistable multivibrator 36 and the base of emitter follower 107. Voltage from a D.C. source 108 is applied through a resistor 109 to the common anode connection of diodes 105 and 106. The values of resistors 109 and 112 are such that resistor 109 has twice the resistance of resistor 112.

In order to develop the 10 volt level, diodes 110 and 111 are connected between the output of bistable multivibrator 37 and the base of transistor 107. The D.C. voltage from source 108 is applied through resistor 112 to the common anode connection of diodes 110 and 111.

The operation of the circuit of FIG. 7 in producing the four level control voltage is as follows. Initially, bistable multivibrators 36 and 27 are in their 1 condition, that is, the right-hand element in each multivibrator is conducting thereby applying a voltage to the cathodes of diodes 105 and 110 which is more negative than the voltage applied to the anodes. When the cathodes of diodes 105 and 110 are negative with respect to their anodes, no current can flow to the base of transistor 107. Therefore, the emitter of transistor 107 is approximately at ground potential which is applied to the line 75.

After the occurrence of the first transmitter pulse and the detection of the acoustic impulse at the first receiver, bistable multivibrator 36 is switched to the 2 condition. The right-hand element of bistable multivibrator 36 is switched off and a positive-going voltage is applied to the cathode of diode 105. This back-biases diode 105 and permits base current to flow from source 108 through resistor 109 and diode 106 to the base of transistor 107. Transistor 107 conducts thereby developing a voltage across the emitter resistor 113, which voltage is impressed on the line 75. Assume that the resistance 113 has a magnitude Re. The base current for transistor 107 is given by:

(15) $$i_B = E/2R$$

where $i_B$ is the base current; E is the magnitude of voltage source 108; and 2R is the resistance of resistor 109. This will produce a voltage output across resistor 113 which is equal to:

(16) $$e_o = i_B \beta R_e = (E/2R)\beta R_e$$

where $e_o$ is the output voltage; $\beta$ is the current amplification factor of transistor 107; E is the magnitude of voltage source 108; and $R_e$ is the resistance of emitter resistor 113. Since it is desired that the voltage output be 5 volts in this condition, the parameters of the circuit are chosen to produce a 5 volt output.

After the third transmitter pulse and the detection of this pulse by the third receiver, bistable multivibrator 36 is switched to the 1 condition and bistable multivibrator 37 is switched to the 2 condition. With bistable multivibrator 36 in the 1 condition, no base current can flow to transistor 107 through diode 106. When bistable multivibrator 37 is in the 2 condition, a positive voltage is applied to the cathode of diode 110 thereby back-biasing this diode and allowing base current to flow from the source 108 through resistor 112 and diode 111 to the transistor 107. Assuming that resistor 109 has a resistance 2R, which is twice that of resistor 112, which is R, the voltage output impressed by transistor 107 on line 75 is given by:

(17) $$e_o = E/R\beta R_e$$

That is, in this condition, the voltage on line 75 is twice the voltage which was present when bistable multivibrator 36 was in the 2 condition. Since the voltage developed under that condition was 5 volts, the voltage which will be developed when bistable multivibrator 37 is in a 2 condition will be 10 volts.

After the occurrence of the third transmitter pulse and the detection of the acoustic impulse by the third receiver, bistable multivibrator 36 will be switched to the 2 condition thereby leaving both multivibrators 36 and 37 in a 2 condition. Under these conditions, base current will be supplied through both paths and the resultant output voltage will be 15 volts. In this manner, there has been provided a circuit which will switch the line 75 between the control voltage levels of 0, 5 volts, 10 volts and 15 volts.

Figures 8, 9:
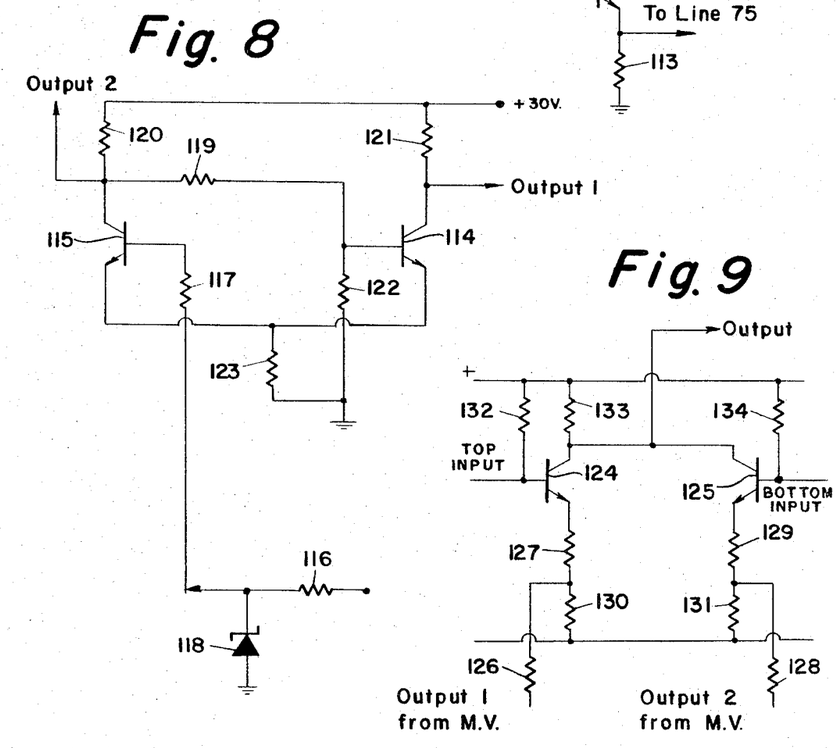
FIG. 8 shows a trigger circuit suitable for use as any of the multivibrators used in carrying out the invention.
FIG. 9 shows a gating circuit suitable for use in carrying out the invention.

A typical circuit which may be used for the multivibrators 24, 25 or 26 in FIG. 2 is shown in FIG. 8. The other multivibrators are conventional circuits which are generally referred to as flip-flops. This multivibrator circuit includes the usual two active elements which are alternately conducting to provide the 2 condition outputs. The right-hand element of the multivibrator is the transistor 114 and the left-hand element is the transistor 115. The input to the multivibrator is a voltage which switches between ground potential and +5 volts. This input voltage is applied through resistors 116 and 117 to the base of transistor 115. A Zener diode 118 is connected between the input and ground to prevent the input voltage from exceeding an acceptable voltage limit. When the input voltage is at ground potential, the transistor 115 is cut off. The positive voltage at the collector of transistor 115 is applied through resistor 119 to the base of transistor 114 thereby rendering that transistor conductive. This condition of the multivibrator has been referred to as the 1 condition. In this condition output #1 at the collector of transistor 114 is at approximately ground potential, and output #2 at the collector of transistor 115 is at a more positive voltage.

When the input voltage switches to +5 volts, the transistor 115 conducts and the collector of this transistor goes negative. This negative-going voltage is applied to the base of transistor 114 which cuts that transistor off. This condition of the multivibrator has been referred to as the 2 state. In this state, output #1 is positive and output #2 is approximately at ground potential.

The bistable multivibrator shown in FIG. 8 can be easily changed to make it a monostable multivibrator suitable for use as the synchronizing, delay, and gating multivibrators which are of the monostable type in FIG. 3. By adding a capacitor across resistor 119 of a value suitable to provide the desired current constant, the multivibrator can be adapted to perform the desired operation.

A gating circuit suitable for use as the gates 20, 21 and 23 in FIG. 2 is shown in FIG. 9. The two signal inputs to the gates are applied to the bases of transistors 124 and 125. To use the same terminology as was used in describing the gates previously, the top signal input to the gate is applied to the base of transistor 124 and the bottom input to the gate is applied to the base of transistor 125. The conduction of these transistors, and therefore the determination of which signal input is connected to the output, is determined by the states of the gating inputs. One gating input which is obtained from output #1 of the multivibrator is applied through resistors 126 and 127 to the emitter of transistor 124. When this gating input is at approximately ground potential, the transistor 124 can conduct and the signal applied to the base of this transistor will appear at the output of the gate. The other gating input, which is obtained from output #2 of the multivibrator, is applied through resistors 128 and 129 to the emitter of transistor 125. When this gating input is at approximately ground potential, transistor 125 conducts and the signal applied to the base thereof will appear at the output of the gate.

When the multivibrator of FIG. 8 is in the 1 condition, output #1 is at ground potential and output #2 is at a more positive potential. Therefore, transistor 124 conducts and the top input to the gate appears at the output thereof. When the bistable multivibrator in FIG. 8 is in the 2 condition, output #1 is positive and output #2 is at ground potential. Therefore, transistor 125 conducts and the signal at the bottom input to the gate appears at the output.

Some typical values of circuit components are given below, it being understood that these values are merely exemplary and are not to be considered in any way limiting. These circuit components are particularly suitable for circuits using the control voltage levels discussed above.

*FIG. 5*

| | |
|---|---|
| Resistor 79 | 1K |
| Resistor 81 | 1K |
| Resistor 82 | 5K |
| Resistor 83 | 5K |
| Resistor 85 | 7.5K |
| Resistor 86 | 3.3K |

*FIG. 8*

| | |
|---|---|
| Transistors 114, 115 | 2N697 |
| Resistor 116 | 1K |
| Resistor 117 | 10K |
| Zener Diode 118 | 1N752 |
| Resistor 119 | 33K |
| Resistor 120 | 4.7K |
| Resistor 121 | 4.7K |
| Resistor 122 | 15K |
| Resistor 123 | 470 ohms |

*FIG. 9*

| | |
|---|---|
| Transistors 124, 125 | 2N697 |
| Resistor 127 | 270 ohms |
| Resistor 129 | 270 ohms |
| Resistor 130 | 3K |
| Resistor 131 | 3K |
| Resistor 133 | 5K |

In addition to the modifications described above, other modifications may be desirable under certain conditions. As described above, the relationship between logging tool rate of travel and signal delay was established by a direct mechanical connection between logging tool drive and magnetic storage drive. This may also be accomplished by well known selsyn drives or by electronic circuitry for maintaining the two in synchronism. Further, while the invention has been described in conjunction with a free-running source of transmitter pulses which produces equally time spaced transmitter pulses, a source of transmitter pulses which is triggered in synchronism with logging tool depth may also be used. Such a source produces transmitter pulses at equal increments of logging tool depth, for example, a transmitter pulses at each five foot increment of borehole depth. It will be appreciated that if the depth increments are related to the receiver spacings, the problem of delaying and combining the receiver outputs is very much simplified.

While preferred embodiments of the invention have been shown and described above, it will, of course, be understood that various other modifications may be made. The appended claims are, therefore, intended to cover any such modifications within the true spirit and scope of the invention.

What is claimed is:

1. An acoustic logging system for producing a log of the acoustic velocity of subsurface formations along a borehole with compensation for irregularities in the borehole diameter comprising
   a logging tool having a single transmitter of acoustic pulses intermediate the ends thereof,
   at least four receivers comprised of first, second, third and fourth receivers for detecting said acoustic pulses, said receivers being spaced one from the other and supported by said logging tool in spaced relationship with said transmitter with the first and second receivers to one side of said transmitter and said third and fourth receivers to the other side of said transmitter,
   means for producing a signal representative of the production of each acoustic pulse by said transmitter,
   means responsive to said signal and to the detection of said acoustic pulses by said receivers for successively producing first, second, third and fourth voltages respectively representative of the travel times of said acoustic pulses from said transmitter through segments of said subsurface formation to said first, second, third and fourth receivers, and
   means coupled to said voltage producing means for combining said first and second voltages representative of the travel times through particular segments of the subsurface formation with said third and fourth voltages representative of travel times through the same subsurface segments to produce a log of the acoustic velocity of the earth as a function of depth.

2. An acoustic logging system for producing in correlation with depth of a borehole a log of the acoustic velocity of subsurface formations surrounding said borehole with compensation for irregularities in borehole diameter and variations in the medium filling the borehole comprising
   a logging tool having a single transmitter for periodically transmitting acoustic impulses into said subsurface formations,
   at least four receivers for detecting said acoustic impulses, the first and second of said receivers being positioned in spaced relationship along said borehole on one side of said transmitter, the third and fourth of said receivers being positioned in spaced relationship along said borehole on the other side of said transmitter,
   gating means responsive to the time occurrence of successive transmitter pulses for transmitting uphole the signals produced by the detection of said acoustic impulses at said first, said second, said third and said fourth receivers,
   means for producing first, second, third and fourth representations of the time intervals between acoustic impulses and the detection of said acoustic impulses at said first, said second, said third and said fourth receivers,
   means for storing said first, second, third and fourth representations,
   means for producing from said third and fourth representations a delayed function, the time period of delay being proportional to $d/r$ where $d$ is the spacing between the midpoint between the receivers on one side of said transmitter and the midpoint between the receivers on the other side of said transmitter and $r$ is the rate at which the logging tool will travel through said borehole,
   means for producing a function from said first and second representations of time intervals, and
   means for combining said function and said delayed function to produce a log of the acoustic velocity of the earth.

3. The logging system recited in claim 2 wherein said gating means includes
   means responsive to the time occurrence of said transmitter pulses for producing two control voltages each of which is selectively switched between two levels in response to successive transmitter pulses thereby providing four combinations of control voltages,
   first, second and third downhole gating circuits, the outputs of said first and said second receivers being connected to said first gating circuit, the outputs of said third and said fourth receivers being connected to said second gating circuit, the outputs of said first and said second gating circuits being connected to the inputs to said third gating circuit,
   a conductor for connecting said logging tool with an uphole location for transmitting said successively detected acoustic impulses to said means for producing said representations, the output of said third gating circuit being connected to said conductor, and
   means responsive to a first combination of said control voltages to open said first and third gating circuits to apply the output of said first receiver to said conductor, and responsive to a second combination of said control voltages to open said first and third gating circuits to apply the output of said second receiver to said conductor, and responsive to a third combination of said control voltages to open said second and third gating circuits to apply the output of said third receiver to said conductor, and further responsive to a fourth combination of said control voltages to open said second and third gating circuits to apply the output of said fourth receiver to said conductor.

4. The acoustic logging system recited in claim 2 wherein said gating means includes
   means at a surface location for producing a single control voltage which is selectively switched between four levels in response to successive transmitter pulses,
   first, second and third downhole gating circuits, the outputs of said first and said second receivers being applied to the input to said first gating circuit, the outputs of said third and said fourth receivers being applied to the input to said second gating circuit, the outputs of said first and said second gating circuits being applied to the input to said third gating circuit,
   a conductor extending between the surface and said logging tool, said gating voltage being applied to said conductor at the surface location, the output of said third downhole gating circuit being applied to said conductor in said tool, and downhole means connected to said conductor and responsive to said four level control voltage for selectively actuating said gating circuits to successively transmit acoustic impulses detected by said four receivers to said surface location.

5. The method of making acoustic velocity measurements of geophysical formations adjacent a borehole comprising the steps of
generating acoustic impulses at a single source positioned in said borehole,
successively detecting acoustic impulses at first and second points spaced along said borehole on one side of said source and at third and fourth points spaced along said borehole on the other side of said source,
storing in correlation with depth functions representative of the time interval between each acoustic impulse and the detection of said impulse at said first, second, third or fourth receiver,
delaying the recorded functions representative of the time intervals between acoustic impulses and the detection of these impulses at said third and said fourth points for an increment of time corresponding with the difference in depth along said borehole between the midpoint of said first and said second points and between the midpoint of said third and said fourth points, and
combining said functions representative of the time intervals between said impulses and the detection of these impulses at said third and fourth receivers with the delayed functions to produce a function representative of the acoustic velocity of said geophysical formations.

6. An acoustic logging system for producing a log of the acoustic velocity of subsurface formations along a borehole with compensation for irregularities in the borehole diameter comprising
a logging tool having a single transmitter of acoustic pulses intermediate the ends thereof,
at least four receivers for detecting said acoustic pulses, said receivers comprised of first and second receivers mounted on the tool to one side of said transmitter and third and fourth receivers mounted on the tool to the other side of said transmitter, said first and second receivers being spaced apart the same distance from each other as said third and fourth receivers are spaced from each other,
means for producing from the outputs of said first and second receivers a signal representative of the travel time of acoustic energy through a segment of earth formation between said first and second receivers,
means for producing from the outputs of said third and fourth receivers a delayed signal representative of the travel time of acoustic energy through the same segment of earth formation between said third and fourth receivers, and
means for averaging said signal and said delayed signal to produce a log of the acoustic velocity of the earth as a function of depth.

7. The acoustic logging system recited in claim 6 wherein means is provided for moving the logging tool along the borehole, and
wherein the means for producing said delayed signal introduces a time delay proportional to $d/r$ where $d$ is the spacing between the midpoint of said first and second receivers and the midpoint of said third and fourth receivers and $r$ is the rate of travel of the logging tool through the borehole.

8. An acoustic logging system for producing a log of the acoustic velocity of subsurface formations along a borehole with compensation for irregularities in the borehole diameter comprising
a logging tool,
means for raising and lowering said tool,
a single transmitter of acoustic impulses intermediate the ends of said tool, at least four receivers for detecting said acoustic impulses, the first and second of said receivers being positioned in spaced relationship along said borehole on one side of said transmitter and the third and fourth of said receivers being positioned in spaced relationship along said borehole on the other side of said transmitter,
means for successively and continuously producing as said logging tool moves through said borehole first, second, third and fourth voltages respectively representative of the travel times of acoustic impulses from said transmitter through segments of said subsurface formation to said first, second, third and fourth receivers,
means for producing from said third and fourth voltages a delayed signal representative of the velocity of the segment of earth formation bounded by said spaced third and fourth receivers, said last-named means introducing a delay whose time period is proportional to $d/r$ where $d$ is the spacing between the midpoint of the receivers on one side of said transmitter and $r$ is the rate at which the logging tool will be moved through the borehole,
means for combining said first and second voltages to produce a signal representative of the velocity of the segment of earth formation bounded by said spaced first and second receivers, and
means for combining said delayed signal and said signal to produce a log of the acoustic velocity of the earth with compensation for irregularities in borehole diameter.

9. The acoustic logging system of claim 8 wherein said means for producing said signal includes
means responsive to said first and second voltages for subtracting one from the other, and said means for producing said delayed signal includes
means having an output and responsive to said third and fourth voltages for subtracting one from the other, and
delay means to which the output of said last-named means is applied.

10. An acoustic logging system for producing in correlation with depth of a borehole a log depicting a characteristic of earth formations adjacent the borehole comprising
a logging tool having at least one transmitter for periodically emitting acoustic impulses,
at least four spaced-apart receivers mounted on said tool in spaced relation to said transmitter and each detecting said impulses after passage from the transmitter through the adjacent earth formations,
means responsive to the time occurrence of the transmitter impulses for producing two control voltages, each of which is selectively switched between two levels in response to successive transmitter impulses thereby providing four combinations of control voltages,
first, second and third downhole gating circuits, the outputs of said first and said second receivers being connected to said first gating circuit, the outputs of said third and said fourth receivers being connected to said second gating circuit, the outputs of said first and said second gating circuits being connected to the input to said third gating circuit,
a conductor for connecting said logging tool with an uphole location and for transmitting said successively detected acoustic impulses to the uphole location, the output of said third gating circuit being connected to said conductor,
means responsive to a first combination of said control voltages to open said first and third gating circuits to apply the output of said first receiver to said conductor, and responsive to a second combination of said control voltages to open said first and third gating circuits to apply the output of said second receiver to said conductor, and responsive to a third combination of said control voltages to open said second and third gating circuits to apply the output of said third receiver to said conductor, and further responsive to a fourth combination of said control voltages to open said second and third gating circuits to apply the output of said fourth receiver to said conductor, means responsive to said receiver outputs and connected to an opposite end of said conductor for producing first, second, third and fourth representations of the characteristics as determined by detection of said acoustic impulses in said first, said second, said third and said fourth receivers, means for storing said first, second, third and fourth representations, and means for combining said stored representations to produce a log of the characteristic of the earth.

11. An acoustic logging system for producing in correlation with depth of a borehole a log depicting a characteristic of earth formations adjacent the borehole comprising a logging tool having at least one transmitter for periodically emitting acoustic impulses, at least four spaced-apart receivers mounted on said tool in spaced relation to said transmitter and each detecting said impulses after passage from the transmitter through the adjacent earth formations, means at a surface location for producing a single control voltage which is selectively switched between four levels in response to successive transmitter impulses, first, second and third downhole gating circuits, the outputs of said first and said second receivers being applied to the input to said first gating circuit, the outputs of said second and said fourth receivers being applied to the input to said second gating circuit, the outputs of said first and said second gating circuits being applied to the input to said third gating circuit, a conductor extending between the surface and said logging tool, said gating voltage being applied to said conductor at said surface location, the output of said third downhole gating circuit being applied to said conductor, downhole means being connected to said conductor and responsive to said four levels of control voltage for selectively actuating said gating circuits to successively transmit acoustic impulses detected by said four receivers to said surface location, means responsive to said receiver outputs and connected to an opposite end of said conductor for producing first, second, third and fourth representations of the time intervals between acoustic impulses and the detection of said acoustic impulses in said first, said second, said third and said fourth receivers, means for storing said first, second, third and fourth representations, and means for combining said stored representations to produce a log of the acoustic velocity of the earth.

12. An acoustic logging system for determining a characteristic of earth formations adjacent a borehole comprising a downhole tool, a single transmitter carried by the downhole tool for emitting spaced-apart acoustic pulses, a first pair of spaced-apart receivers spaced above said transmitter in a direction extending longitudinally of the borehole and each detecting said pulses after passage from the transmitter through the formations, a second pair of spaced-apart receivers spaced below said transmitter in a direction extending longitudinally of the borehole and each detecting said pulses after passage from the transmitter through the earth formations, means responsive to the pulses detected by the first pair of receivers for producing a first signal having a parameter affected by said characteristic, means responsive to the pulses detected by the second pair of receivers for producing a second signal having a parameter affected by said characteristic, a delay means connected to receive said first signal for delaying said first signal by a time period correlated with the movement of the downhole tool through borehole, said time period being of such amount that the second signal and the output of the delay means relate to measurements made in a common area of borehole formations, means jointly responsive to said delayed signal from said delay means and to said second signal for producing a combined signal in which the effect of variations in borehole diameter on said first and second signals is substantially eliminated, and means for recording said combined signal as a function of depth.

13. An acoustic logging system for determining a characteristic of earth formations adjacent a borehole comprising a downhole tool, a single transmitter carried by the downhole tool for emitting spaced-apart acoustic pulses, a first pair of spaced-apart receivers spaced to one side of said transmitter in a direction extending longitudinally of the borehole and each detecting said pulses after passage from the transmitter through the formations, a second pair of spaced-apart receivers spaced to the other side of said transmitter in a direction extending longitudinally of the borehole and each detecting said pulses after passage from the transmitter through the earth formations, means responsive to the pulses detected by the first pair of receivers for producing a first signal having a parameter affected by said characteristic, means responsive to the pulses detected by the second pair of receivers for producing a delayed second signal having a parameter affected by said characteristic, said last-named means delaying said second signal by a time period correlated with the movement of the downhole tool through the borehole, said time period being of such amount that the delayed second signal and said first signal relate to measurements made in a common area of borehole formations, means jointly responsive to said delayed second signal and to said first signal for producing a combined signal in which the effect of variations in borehole diameter on said first and second signals is substantially eliminated, and means for recording said combined signal as a function of depth.

14. The acoustic logging system defined by claim 13 wherein the spacing between the first and second receivers is equal to the spacing between the third and fourth receivers.

15. The apparatus defined by claim 13 wherein the first signal is proportional to the travel time of the acoustic pulses through the earth formations in the length of borehole located between the receivers of the first pair and wherein the second signal is proportional to the travel time of the acoustic pulses through the earth formations in the length of borehole located between the receivers of the second pair.

16. A method of logging a borehole to determine a characteristic of earth formations traversed thereby, said method comprising the steps of passing spaced-apart acoustic pulses through the earth formations from a source disposed within the borehole, detecting said pulses at a first pair of spaced-apart receiving points located above and spaced from said source and at a second pair of spaced-apart receiving points located below and spaced from said source, moving said source and both pairs of receiving points through the borehole while maintaining a fixed longitudinal spacing therebetween, utilizing the pulses detected at the first pair of receiving points to produce a first combined electrical signal having a parameter affected by said characteristic, utilizing the pulses detected at the second pair of receiving points to produce a second combined electrical signal having a parameter affected by said characteristic, delaying one of said combined signals for a predetermined period of such amount that the delayed combined signal and the other combined signal relate to measurements made in a common area of borehole formations, combining said delayed signal and said other combined signal to produce a composite signal, and recording said composite signal as a function of depth.

17. A method of logging a borehole to determine the velocity of propagation of earth formations traversed thereby, said method comprising the steps of passing spaced-apart acoustic pulses through the earth formations from a source disposed within the borehole, detecting said pulses at a first pair of spaced-apart receiving points located above and spaced from said source and at a second pair of spaced-apart receiving points located below and spaced from said source, moving said source and both pairs of receiving points through the borehole while maintaining a fixed longitudinal spacing therebetween, utilizing the pulses detected at the first pair of receiving points to produce a first combined electrical signal having an amplitude proportional to the travel time of acoustic pulses through the earth formations in the length of borehole between the first pair of receiving points, utilizing the pulses detected at the second pair of receiving points to produce a second combined electrical signal having an amplitude proportional to the travel time of acoustic pulses through the earth formations in the length of borehole between the second pair of receiving points, delaying one of said combined signals for a predetermined period of such amount that the delayed combined signal and the other combined signal relate to travel time measurements made through a common area of borehole formations, combining said delayed signal and said other combined signal to produce a composite signal, and recording said composite signal.

18. In an acoustic logging system for determining the velocity of propagation of earth formations adjacent a borehole, the combination of a downhole tool, means for raising and lowering said tool within the borehole, a transmitter carried by said tool for emitting spaced-apart acoustic pulses, a first pair of fixedly spaced receivers located above and spaced a fixed distance from said transmitter and each detecting the acoustic pulses after passage through the earth formations, a second pair of fixedly spaced receivers located below and spaced a fixed distance from said transmitter and each detecting the acoustic pulses after passage through the earth formations, means responsive to the pulses detected by the first pair of receivers for producing a first signal representing the travel time of the acoustic pulses through the earth formations in the length of borehole disposed between the receivers of the first pair, means responsive to the pulses detected by the receivers of the second pair for producing a second signal representing the travel time of the acoustic pulses through the earth formations in the length of borehole disposed between the receivers of the second pair, time delay means for delaying one of said signals for a period of time correlated with the rate of movement of the downhole tool through the borehole, and means for combining the delayed signal and the other signal to develop an average signal, the amount of time delay introduced by said time delay means being such that the two signals combined by said combining means relate to a common area of borehole formations, whereby the effect of borehole diameter variations upon the combined signal is substantially eliminated.

References Cited by the Examiner

UNITED STATES PATENTS

| | | | |
|---|---|---|---|
| 2,708,485 | 5/1955 | Vogel | 181—.5 |
| 3,093,811 | 6/1963 | Schneider | 181—.5 |
| 3,096,502 | 7/1963 | Vogel | 181—.5 |
| 3,207,256 | 9/1965 | Blizard | 181—.5 |
| 3,212,598 | 10/1965 | Anderson | 181—.5 |

BENJAMIN A. BORCHELT, *Primary Examiner.*

R. M. SKOLNIK, *Assistant Examiner.*